(12) United States Patent
Kim et al.

(10) Patent No.: US 12,321,171 B2
(45) Date of Patent: Jun. 3, 2025

(54) AUTONOMOUS VEHICLE, METHOD FOR REQUESTING CONTROL REMOTELY THEREOF

(71) Applicants: HYUNDAI MOTOR COMPANY, Seoul (KR); Kia Corporation, Seoul (KR)

(72) Inventors: Hee Gwon Kim, Seoul (KR); Wan Jae Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 45 days.

(21) Appl. No.: 17/902,362

(22) Filed: Sep. 2, 2022

(65) Prior Publication Data
US 2023/0251652 A1  Aug. 10, 2023

(30) Foreign Application Priority Data
Feb. 4, 2022 (KR) .................. 10-2022-0015026

(51) Int. Cl.
*G05D 1/00* (2024.01)
(52) U.S. Cl.
CPC ......... *G05D 1/0061* (2013.01); *G05D 1/0022* (2013.01)
(58) Field of Classification Search
CPC ............ G05D 1/0061; G05D 1/0022; G05D 2201/0213; G05D 1/0011; B60W 50/16; B60W 60/005; B60W 60/0061; B60W 2300/00; B60W 2530/213; B60W 2540/041; B60W 2540/049; B60W 60/007; B60W 60/0016; B60W 10/20; B60W 30/18054; B60W 30/181; B60W 40/02; B60W 40/10; B60W 60/0051; B60W 60/0053; B60W 2050/0005;
(Continued)

(56) References Cited

U.S. PATENT DOCUMENTS 9,134,731 B2   9/2015  Healey et al.
9,933,781 B1   4/2018  Bando et al.
10,328,897 B1* 6/2019  Nabbe .................... G06F 21/44
(Continued)

FOREIGN PATENT DOCUMENTS

JP     2021011233 A  *  2/2021  ........... G05D 1/0055
KR  10-2018-0008191 A      1/2018
(Continued)

*Primary Examiner* — Anne Marie Antonucci
*Assistant Examiner* — Kirsten Jade M Santos
(74) *Attorney, Agent, or Firm* — MORGAN, LEWIS & BOCKIUS LLP

(57) ABSTRACT

The present disclosure relates to an autonomous vehicle and a remote control request method therefor. An exemplary embodiment of the present disclosure provides an autonomous vehicle including: a processor configured to determine whether the autonomous vehicle is in a state in which remote control is enabled to be performed when the remote control of the autonomous vehicle is required, and to request a control system to perform the remote control when the autonomous vehicle is in the state in which the remote control is enabled to be performed; and a communication device configured to perform communication with the control system under control of the processor.

18 Claims, 12 Drawing Sheets

(58) Field of Classification Search
CPC ... B60W 2050/0064; B60W 2050/007; B60W 2520/04; B60W 2556/45
See application file for complete search history.

(56) References Cited

U.S. PATENT DOCUMENTS

| | | |
|---|---|---|
| 10,528,045 B2 | 1/2020 | Kim et al. |
| 11,378,957 B1 | 7/2022 | Cheng et al. |
| 2015/0057869 A1 | 2/2015 | Healey et al. |
| 2016/0138924 A1* | 5/2016 | An .................. G01C 21/34 701/25 |
| 2018/0017970 A1 | 1/2018 | Kim et al. |
| 2019/0210613 A1 | 7/2019 | Sun et al. |
| 2020/0192351 A1* | 6/2020 | Rastoll .................. G06V 20/58 |
| 2021/0086790 A1 | 3/2021 | Nordbruch |
| 2022/0185271 A1 | 6/2022 | Cheng et al. |

FOREIGN PATENT DOCUMENTS

| | | |
|---|---|---|
| KR | 10-1847500 B1 | 5/2018 |
| KR | 10-2112684 B1 | 6/2020 |
| KR | 10-2021-0069132 A | 6/2021 |
| KR | 10-2021-0097233 A | 8/2021 |
| KR | 10-2288844 B1 | 8/2021 |

\* cited by examiner

AUTONOMOUS VEHICLE, METHOD FOR REQUESTING CONTROL REMOTELY THEREOF

CROSS-REFERENCE TO RELATED APPLICATION

This application claims priority to and benefits of Korean Patent Application No. 10-2022-0015026, filed in the Korean Intellectual Property Office on Feb. 4, 2022, the entire contents of which are incorporated herein by reference.

TECHNICAL FIELD

The present disclosure relates to an autonomous vehicle and a remote control request method therefor, and more particularly, to a technique for generating a remote control request signal for an autonomous vehicle.

BACKGROUND

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or an occupant.

While driving in an autonomous driving mode, there may be a situation in which it is impossible to follow a driving path to the destination normally although there is no abnormality in a function of the vehicle. As such, when a situation where it is impossible to follow a path occurs during autonomous driving, it is often difficult to follow the driving path, such as when the driver directly intervenes in control of the vehicle or when the driver's intervention is difficult, the vehicle stops.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

An exemplary embodiment of the present disclosure has been made in an effort to provide an autonomous vehicle and a remote control request method therefor, capable of transmitting a remote control request signal to a control system by determining a road situation at a current position of vehicle and whether remote control driving is possible in the event of a situation where autonomous driving is impossible while an autonomous vehicle is autonomously driving.

The technical objects of the present disclosure are not limited to the objects mentioned above, and other technical objects not mentioned can be clearly understood by those skilled in the art from the description of the claims.

An exemplary embodiment of the present disclosure provides an autonomous vehicle, including: a processor configured to determine whether the autonomous vehicle is in a state in which remote control is enabled to be performed when the remote control of the autonomous vehicle is required, and to request a control system to perform the remote control when the autonomous vehicle is in the state in which the remote control is enabled to be performed; and a communication device configured to perform communication with the control system under control of the processor.

In an exemplary embodiment, it may further include a sensing device configured to detect autonomous driving information and vehicle state information.

In an exemplary embodiment, the sensing device may include: one or more sensors; and one or more information processing modules configured to perform object fusion based on output information of the one or more sensors.

In an exemplary embodiment, the processor may determine whether the autonomous vehicle is in the state in which the remote control is enabled to be performed through determination of at least one of whether the one or more sensors operate normally, whether the one or more information processing modules operate normally, whether a global path is abnormal, whether a local path is abnormal, or whether a communication state is abnormal.

In an exemplary embodiment, the processor may receive an output value of an alive counter from the one or more sensors every predetermined cycle to determine whether the one or more sensors are operating normally.

In an exemplary embodiment, the processor may receive an output value of an alive counter from the one or more information processing modules every predetermined cycle to determine whether the one or more information processing modules are operating normally.

In an exemplary embodiment, the processor may determine that the global path is in an abnormal state when a destination does not exist on the global path.

In an exemplary embodiment, the processor may determine a distance of a drivable path generated without the destination when the destination does not exist on the global path.

In an exemplary embodiment, the processor may control the communication device to transmit the length of the drivable path when the control system is requested to perform the remote control.

In an exemplary embodiment, the processor may determine that the global path is in a normal state when a global path planning (GPP) flag is normal.

In an exemplary embodiment, the processor may determine that a remote control request transferred to the control system is possible when the autonomous vehicle is in a normal stop state.

In an exemplary embodiment, in the case where a stop state of the autonomous vehicle is maintained for a predetermined time period, the processor may determine that the autonomous vehicle is in a normal stop state when the autonomous vehicle is in a waiting state depending on a traffic signal or traffic flow, and the processor may determine that the autonomous vehicle is in an abnormal stop state as an abnormal state of a local path when it stops regardless of the traffic signal or the traffic flow and a front situation.

In an exemplary embodiment, the processor may determine that the autonomous vehicle is normally stopped when the autonomous vehicle is stopped for more than a reference time period that is predetermined by the control system or the autonomous vehicle is stopped at a place that is predetermined by the control system.

In an exemplary embodiment, the processor may immediately request the control system to perform the remote control when the autonomous vehicle is stopped for more than a reference time period that is predetermined by the control system or the autonomous vehicle is stopped at a place that is predetermined by the control system.

In an exemplary embodiment, when arbitrary manipulation of a steering device or an acceleration or deceleration device is inputted by a driver, or manipulation of an emergency autonomous driving release button is inputted during an autonomous driving mode or a remote control mode, the processor may release the autonomous driving mode or the remote control mode, and switch to a manual driving mode.

An exemplary embodiment of the present disclosure provides a remote control request method for an autonomous vehicle, including: determining, by a processor, whether the autonomous vehicle is in a state in which remote control is enabled to be performed when the remote control of the autonomous vehicle is required; and requesting, by the processor, a control system to perform the remote control when the autonomous vehicle is in the state in which the remote control is enabled to be performed.

In an exemplary embodiment, the determining of whether the autonomous vehicle is in the state in which the remote control is enabled to be performed may include determining whether the autonomous vehicle is in the state in which the remote control is enabled to be performed through determination of at least one of whether one or more sensors for detecting autonomous driving information and vehicle state information operate normally, whether one or more information processing modules for performing object fusion based on output information of the one or more sensors operate normally, whether a global path is abnormal, whether a local path is abnormal, or whether a communication state is abnormal.

In an exemplary embodiment, the determining of whether the autonomous vehicle is in the state in which the remote control is enabled to be performed may further include receiving an output value of an alive counter from the one or more sensors every a predetermined cycle to determine whether the one or more sensors are operating normally; and receiving an output value of an alive counter from the one or more information processing modules every a predetermined cycle to determine whether the one or more information processing modules are operating normally.

In an exemplary embodiment, the determining of whether the autonomous vehicle is in the state in which the remote control is enabled to be performed includes determining that the global path is in an abnormal state when a destination does not exist on the global path; determining a distance of a drivable path generated without the destination when the destination does not exist on the global path; and determining that the remote control is possible when the global path is in a normal state or the length of the drivable path generated without the destination is determined.

In an exemplary embodiment, the determining of whether the autonomous vehicle is in the state in which the remote control is enabled to be performed may further include determining that a remote control request transferred to the control system is possible when the autonomous vehicle is in a normal stop state.

According to the present technique, marketability of autonomous driving may be improved by transmitting a remote control request signal to a control system by determining a road situation at a current position of vehicle and whether remote control driving is possible in the event of a situation where autonomous driving is impossible while an autonomous vehicle is autonomously driving.

According to the present technique, it is also possible to determine timing and difficulty of a remote control request depending on a function development level of the autonomous vehicle.

Further, according to the present technique, it is possible to switch from a remote control mode to an autonomous driving mode in consideration of a case in which remote control is not required during the remote control.

In addition, various effects that can be directly or indirectly identified through this document may be provided.

DETAILED DESCRIPTION OF THE EMBODIMENTS

Figure 1:
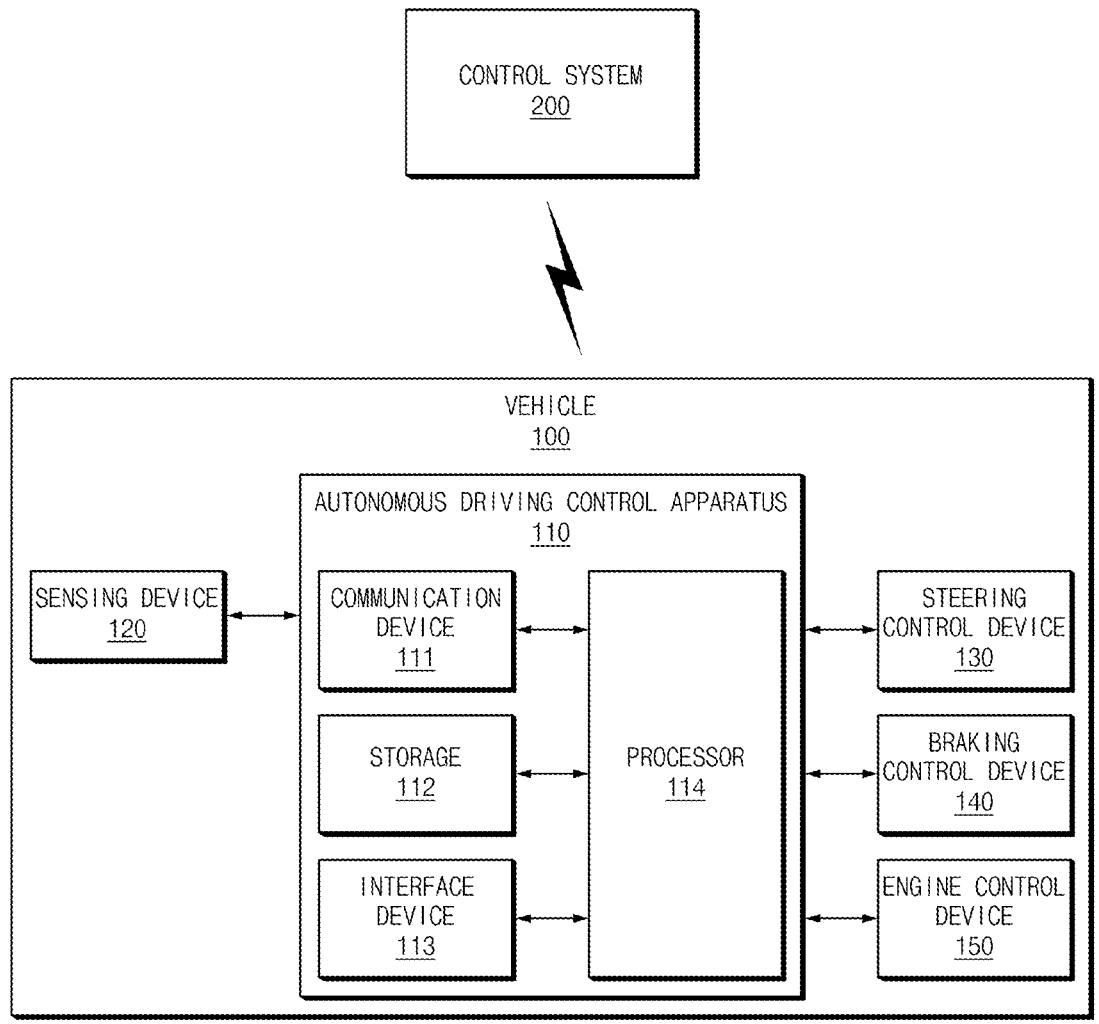
FIG. 1 illustrates a block diagram showing a configuration of a remote control system for an autonomous apparatus according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 7.

Figure 2:
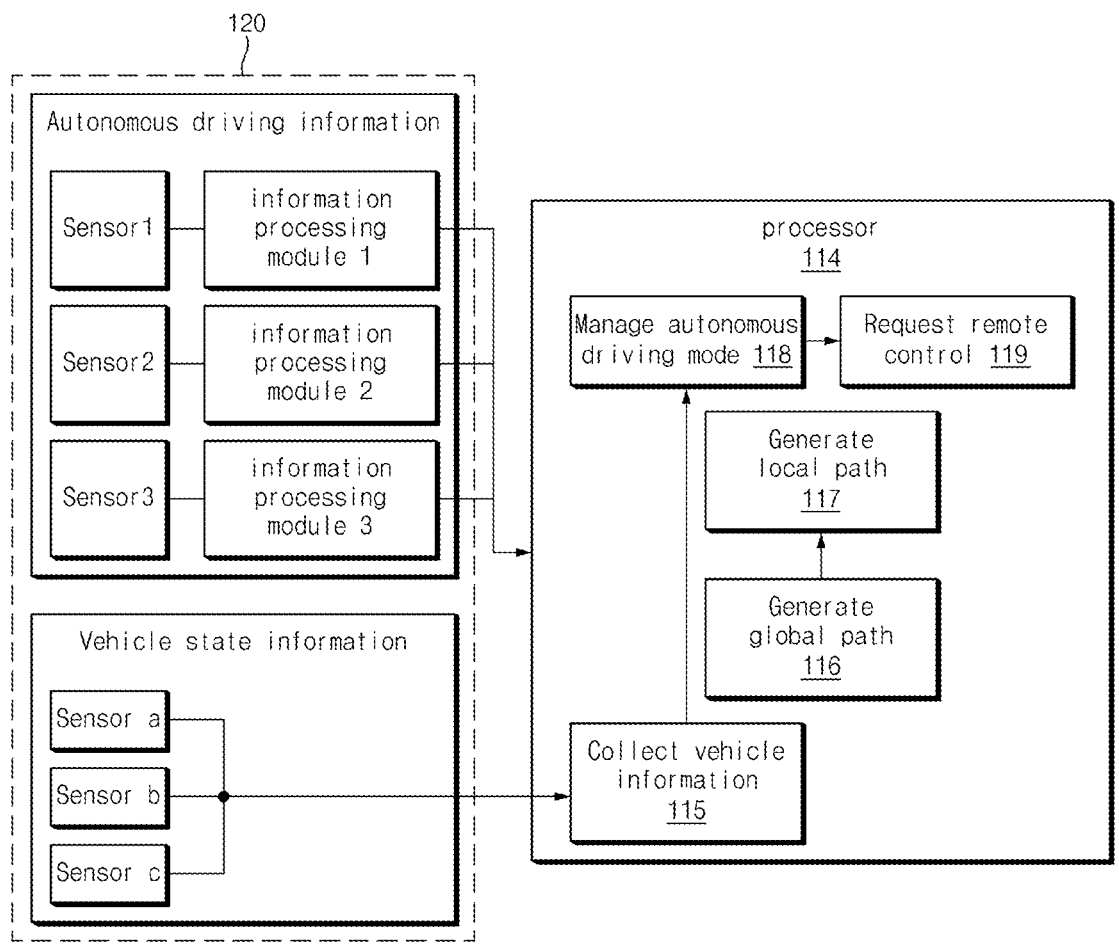
FIG. 2 illustrates a schematic diagram showing a function of an autonomous vehicle according to an exemplary embodiment of the present disclosure.

FIG. 1 illustrates a block diagram showing a configuration of a remote control system for an autonomous apparatus according to an exemplary embodiment of the present disclosure, and FIG. 2 illustrates a schematic diagram showing a function of an autonomous vehicle according to an exemplary embodiment of the present disclosure.

Referring to FIG. 1, the remote control system for an autonomous vehicle according to an exemplary embodiment of the present disclosure includes a vehicle 100 and a control system 200, and remote control may be performed through communication between the vehicle 100 and the control system 200. In this case, the vehicle 100 may include an autonomous vehicle.

The vehicle 100 may include an autonomous driving control apparatus 110, a sensing device 120, a steering control device 130, a braking control device 140, and an engine control device 150.

The autonomous driving control apparatus 110 according to the exemplary embodiment of the present disclosure may be implemented inside the vehicle. In this case, the autonomous driving control apparatus 110 may be integrally formed with internal control units of the vehicle, or may be implemented as a separate device to be connected to control units of the vehicle by a separate connection means.

When a situation in which autonomous driving is impossible occurs during autonomous driving of the vehicle 100, the autonomous driving control apparatus 110 may determine that remote control is required, and may request remote control from the control system 200. In this case, the remote control may be performed in a state in which autonomous driving is possible (DDT, dynamic driving task). Accordingly, the autonomous driving control apparatus 110 determines a road situation at a current position of the vehicle 100 and whether it is in a state in which the remote control is possible, and requests the control system 200 to perform remote control when it is in a state in which the remote control is possible.

In this case, the autonomous driving control apparatus 110 may request the control system 200 to perform the remote control after determining whether a state of the vehicle and a surrounding state are a state in which the remote control is possible.

To that end, the autonomous driving control apparatus 110 may determine whether the state of the vehicle and the surrounding state are a state in which the remote control is possible by determining whether a plurality of sensors of the sensing device 120 or an information processing module for information processing, etc. are in a normal state, whether autonomous driving is possible, whether there is an abnormality in a global path, whether there is an abnormality in a local path, or whether there is an abnormality in a communication state, etc.

Referring to FIG. 1, the autonomous driving control apparatus 110 may include a communication device 111, a storage 112, an interface device 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device 111 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), Ethernet communication, etc. In addition, short-range communication technique may include bluetooth, ZigBee, ultra wideband (UWB), radio frequency identification (RFID), infrared data association (IrDA), and the like. For example, the communication device 111 may perform wireless communication with the control system 200, may transmit vehicle position information (e.g., vehicle coordinates), vehicle surrounding information (e.g., obstacle information), traffic signal information, a remote control request, a vehicle path, and drivable path length information to the control system 200, and may receive a remote control command or the like from the control system 200.

The storage 112 may store detecting results of the sensing device 120, information received from the control system 200, data and/or algorithms required for the processor 114 to operate, and the like.

As an example, the storage 112 may store vehicle surrounding information (image data captured through a camera), a vehicle path (travel path from origin to destination), a correction path received from the control system 200, coordinates of a reference point of the correction path, a remote control command, and the like.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the autonomous driving control apparatus 110 and results thereof. Herein, the input means may include a key button, and may further include a mouse, a keyboard, a touch screen, a microphone, a joystick, a jog shuttle, a stylus pen, and the like. In addition, the input means may further include a soft key implemented on the display.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display.

As an example, the interface device 113 may be implemented as a head-up display (HUD), a cluster, an audio video navigation (AVN), a human machine interface (HM), a user setting menu (USM), or the like.

For example, the interface device 113 may display a vehicle path, a vehicle state, a remote control state, a remote control request state, and the like. The interface device 113 may receive information from a driver, and for this purpose, a mouse, a keyboard, a touch screen, and a microphone may be provided.

The processor 114 may be electrically connected to the communication device 111, the storage 112, the interface device 113, and the like, may electrically control each component, and may be an electrical circuit that executes software commands, thereby performing various data processing and calculations described below.

The processor 114 may process a signal transferred between components of the autonomous driving control apparatus 110, and may perform overall control such that each of the components can perform its function normally.

The processor 114 may be implemented in the form of hardware, software, or a combination of hardware and software, or may be implemented as microprocessor, and may be, e.g., an electronic control unit (ECU), a micro controller unit (MCU), or other subcontrollers mounted in the vehicle.

When the remote control of the autonomous vehicle 100 is required, the processor 114 determines whether the autonomous vehicle 100 is in a state in which remote control is enabled to be performed, and may request the control system 200 to perform the remote control when the autonomous vehicle 100 is in the state in which the remote control is enabled to be performed.

The processor 114 determines whether the autonomous vehicle is in a state in which remote control is enabled to be performed through determination of at least one of whether one or more sensors for detecting autonomous driving information and vehicle state information operate normally, whether one or more information processing modules for performing object fusion based on output information of one or more sensors operate normally, whether a global path is abnormal, whether a local path is abnormal, or whether a communication state is abnormal.

The processor 114 may receive an output value of an alive counter from one or more sensors every predetermined cycle to determine whether the one or more sensors are operating normally.

The processor 114 may receive an output value of an alive counter from one or more information processing modules every predetermined cycle to determine whether the one or more information processing modules are operating normally. The one or more information processing modules may be an electrical circuit that executes software commands, thereby performing various data processing and calculations described herein. The one or more information processing modules may be implemented in the form of hardware, software, or a combination of hardware and software.

That is, when a destination does not exist on the global path, the processor 114 may determine that the global path is in an abnormal state.

When a destination does not exist on the global path, the processor 114 may determine a distance of a drivable path generated without the destination.

The processor 114 may control the communication device to transmit the length of the drivable path when a remote control request is transferred to the control system 200.

The processor 114 may determine that the global path is in a normal state when a global path planning (GPP) flag is normal.

When the autonomous vehicle is in a normal stop state, the processor 114 may determine that the remote control request transferred to the control system 200 is possible.

In the case where a stop state of the autonomous vehicle is maintained for a predetermined time period, the processor 114 determines that the autonomous vehicle is in a normal stop state when the autonomous vehicle is in a waiting state depending on a traffic signal or traffic flow, and may determine that the autonomous vehicle is in an abnormal stop state as an abnormal state of a local path when it stops regardless of the traffic signal or the traffic flow and a front situation.

The processor 114 determines that the autonomous vehicle is normally stopped when the autonomous vehicle is stopped for more than a reference time period that is predetermined by the control system 200 or the autonomous vehicle is stopped at a place that is predetermined by the control system 200.

The processor 114 may immediately request the control system 200 to perform the remote control when the autonomous vehicle is stopped for more than the reference time period that is predetermined by the control system 200 or the autonomous vehicle is stopped at the place that is predetermined by the control system 200.

The processor 114 may release an autonomous driving mode or a remote control mode, and switch to a manual driving mode when arbitrary manipulation of a steering device or an acceleration or deceleration device is inputted by a driver, or manipulation of an emergency autonomous driving release button is inputted during the autonomous driving mode or the remote control mode.

The sensing device 120 obtains autonomous driving information and vehicle state information to provide it to the processor 114.

The autonomous driving information, which is information necessary for autonomous driving, may include detection information of an external object (e.g., a preceding vehicle or a rear vehicle) positioned around the vehicle, a distance with and/or a relative speed to the external object, steering information of an external object, etc. The vehicle state information may include a speed of a vehicle, steering of the vehicle, and the like.

To that end, as illustrated in FIG. 2, the sensing device 120 may include a plurality of sensors, sensor 1, sensor 2, sensor 3, etc. for acquiring the autonomous driving information, and information processing modules information processing module 1, information processing module 2, information processing module 3 for processing information for processing information of each of the sensors. As such, the sensing device 120 may include a plurality of sensors to detect an external object of the vehicle, to obtain information related to a position of the external object, a speed of the external object, a moving direction of the external object, and/or a type of the external object (e.g., vehicles, pedestrians, bicycles or motorcycles, etc.). In this case, the information processing modules may provide an activation state of each sensor and sensor information to the processor 114. The plurality of sensors, sensor 1, sensor 2, sensor 3, etc. may include an ultrasonic sensor, a radar, a camera, a laser scanner, and/or a corner radar, a lidar, an acceleration sensor, and the like.

In addition, the sensing device 120 may include a plurality of sensors sensor a, sensor b, sensor c, etc. for acquiring vehicle state information. In this case, the vehicle state information may include physical quantity information of the vehicle, such as speed, acceleration, and angular velocity of the vehicle. In this case, the vehicle state information may be received from in-vehicle devices other than the sensing device 120. For example, an MCU alive counter, flag information, etc. may be received from control devices in the vehicle. The sensors, sensor a, sensor b, sensor c, etc. may include an acceleration sensor, a yaw rate sensor, a torque measuring sensor and/or a wheel speed sensor, a steering angle sensor, and the like.

In addition, the vehicle 100 may further include a global positioning system (GPS) receiving device in addition to the sensing device 120.

The steering control device 130 may be configured to control a steering angle of a vehicle, and may include a steering wheel, an actuator interlocked with the steering wheel, and a controller controlling the actuator.

The braking control device 140 may be configured to control braking of the vehicle, and may include a controller that controls a brake thereof.

The engine control device 150 may be configured to control engine driving of a vehicle, and may include a controller that controls a speed of the vehicle.

When a remote control request and vehicle information is received from the autonomous vehicle 100, the control system 200 may determine whether remote control is possible based on the information received from the vehicle 100, and may generate a remote control command to transmit it to the vehicle 100. In this case, the vehicle information may include vehicle state information, vehicle surrounding state information, and the like.

Referring to FIG. 2, the processor 114 may collect vehicle information from the sensing device 120 and in-vehicle control devices (115), and may generate a global path from a departure point to a destination (116). In addition, the processor 114 may generate a detailed path (local path) (117) based on the global path, may compare and calculate the path, may generate a final path, and may store it in the storage 112. The processor 114 may manage autonomous driving mode (118) and/or request remote control (119).

In addition, the processor 114 may determine whether a situation requiring remote control occurs, when the situation requiring remote control occurs, may collect a vehicle state and autonomous driving information to determine whether it is dynamic driving task, a state in which autonomous driving is possible(DDT), and determine whether a local path at a current position of the vehicle is drivable based on the generated global path. In addition, it is possible to monitor a driver override (emergency manual driving) state during a DDT.

In addition, the processor 114 may check a communication state to perform a remote control request transferred to the control system 200.

Figure 3:
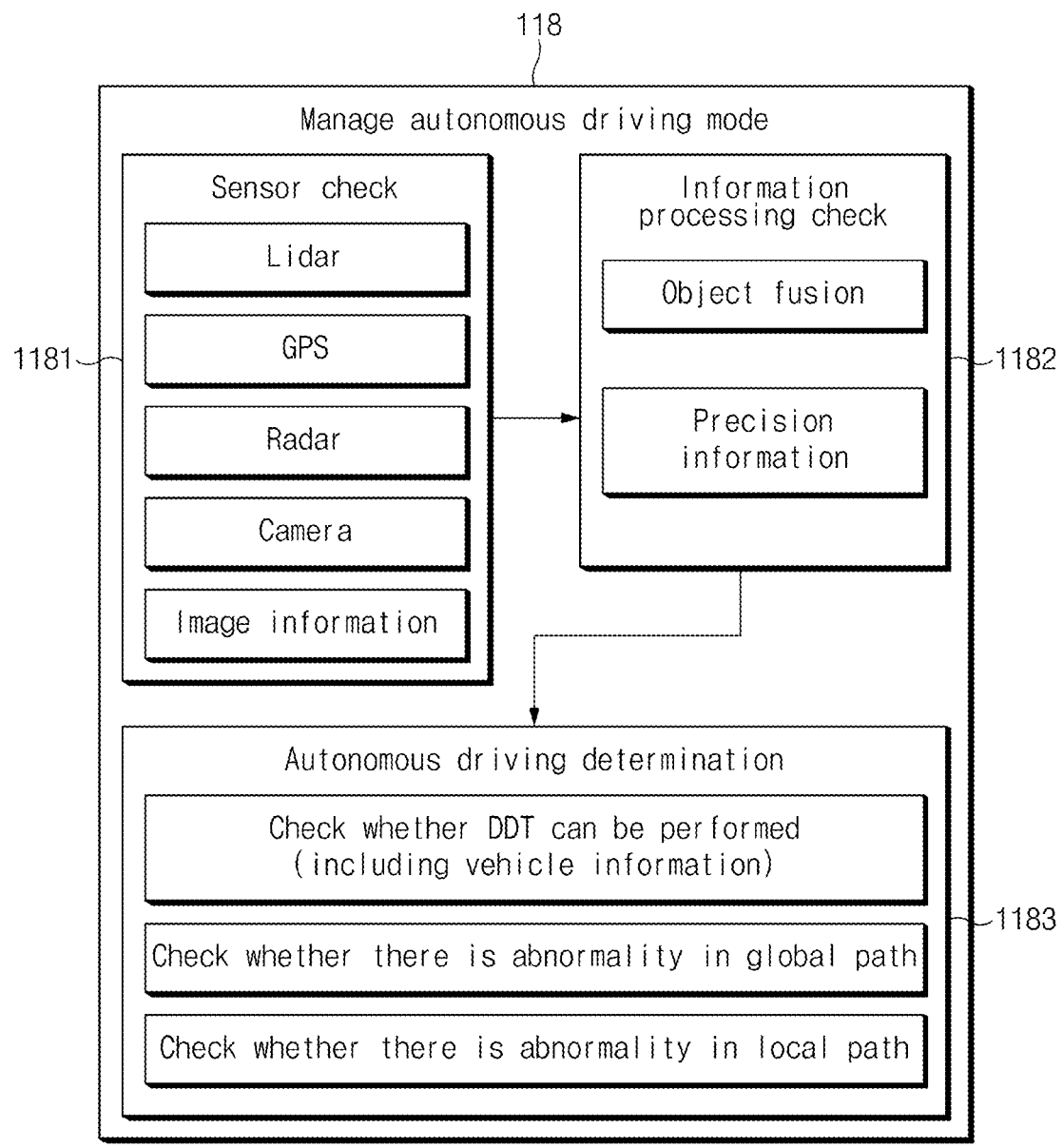
FIG. 3 illustrates a schematic diagram showing an autonomous driving mode management function of the autonomous vehicle of FIG. 2.
Figure 4:
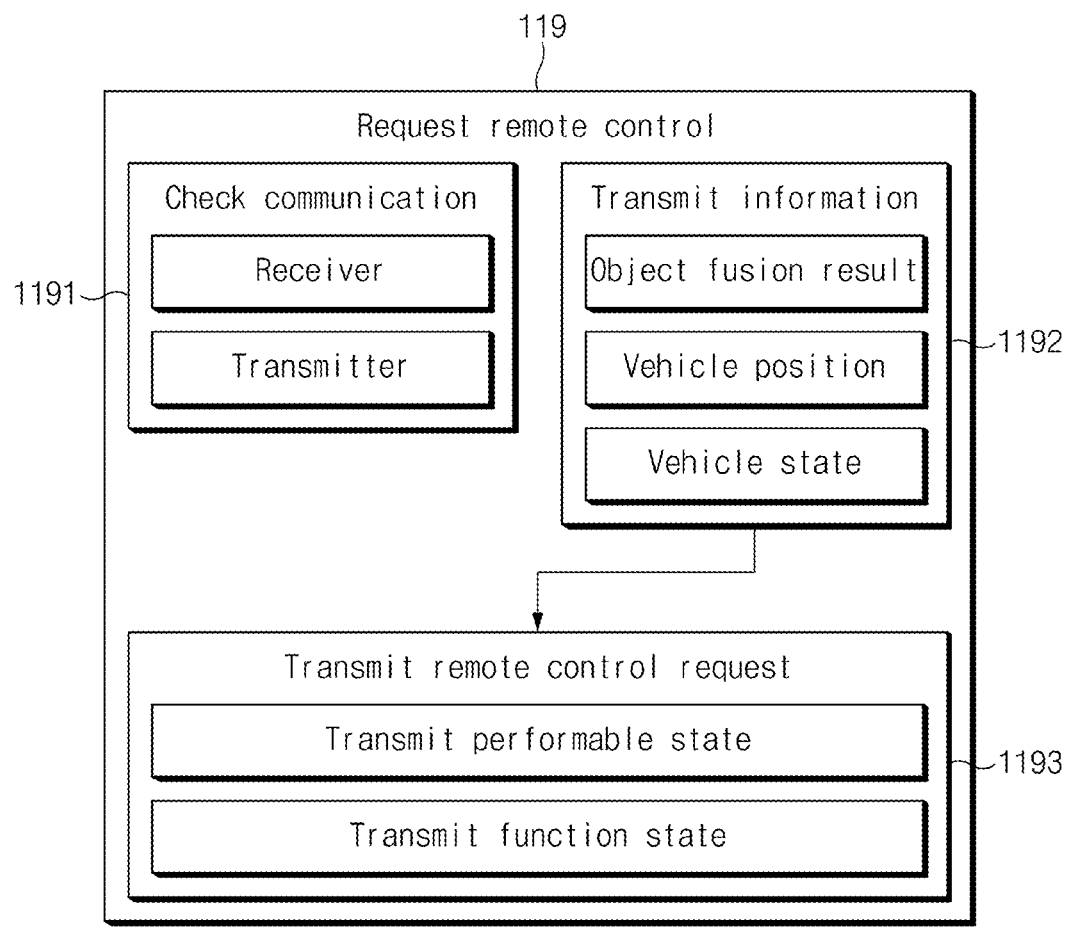
FIG. 4 illustrates a schematic diagram showing a remote assistance request function of the autonomous vehicle of FIG. 3.

FIG. 3 illustrates a schematic diagram showing an autonomous driving mode management function of the autonomous vehicle of FIG. 2, and FIG. 4 illustrates a schematic diagram showing a remote assistance request function of the autonomous vehicle of FIG. 3.

Referring to FIG. 3, the processor 114 may perform sensor check (1181), information processing check (1182), and autonomous driving determination (1183).

The processor 114 may check whether the sensing device 210 and the information processing module operate normally. That is, each sensor and each information processing module of the sensing device 120 outputs an alive counter output value at a predetermined interval during normal operation. Accordingly, the processor 114 may determine whether a normal operation is performed by checking an output value of an alive counter of each sensor and each information processing module at a predetermined interval.

In addition, when the output value of the alive counter is normally outputted from each sensor, the processor 114 may perform object fusion calculation based on the measured value of each sensor, and may perform map matching with a precision map.

The processor 114 may check whether the DDT can be performed. That is, the processor 114 checks whether each sensor and each information processing module is normal at every cycle, and when there is an abnormality, may switch to a fail mode to turn off the autonomous driving function and transmit a cause of the abnormality to the control system 200.

In addition, the processor 114 may monitor a state of arbitrary manipulation (e.g., steering of an occupant and arbitrary manipulation of an acceleration or deceleration device, manipulation of an emergency autonomous driving release button, etc.) of an operable device (e.g., an accelerator pedal, a brake pedal, a steering wheel, etc.) provided in the autonomous driving vehicle to transmit it to the control system 200.

The processor 114 may determine whether a destination is normally displayed on a path to be driven to check whether there is an abnormality in the global path. In addition, the processor 114 may check whether there is an abnormality in a global path. That is, the processor 114 may determine whether the vehicle is in a normal state (waits depending on a traffic signal or flow) or abnormal (stops regardless of a front situation) when the vehicle is in a stopped state.

Referring to FIG. 4, the processor 114 may check a communication state (1191) to transmit a remote control request signal to the control system 200. That is, the processor 114 may check that a receiver of the communication device 111 eventually receives a signal, and a transmitter thereof periodically transmits the signal. In this case, the remote control request signal may correspond to a periodic signal.

When a remote control request is transferred to the control system 200, the processor 114 may transmit vehicle position information and vehicle state information according to a signal protocol with the control system 200 as a result of object fusion of output values of the sensors (1192). In addition, the processor 114 may transmit whether remote control is possible and whether a function of each sensor or information processing module are normal (1193), and when the function is abnormal, a cause of the abnormality may also be transmitted.

As such, according to the present disclosure, when a situation requiring remote control occurs during autonomous driving, at least one or more sensors and at least one information processing module are in a normal operating state and the global path is in a normal state, when the global path is not in a normal state, it is possible to check length information of the drivable path, and when the vehicle is normally stopped, it is determined that the remote control is possible, so that the remote control request may be transferred to the control system. However, according to the present disclosure, when arbitrary manipulation of the steering device and the acceleration or deceleration device is performed by a driver, or manipulation of an emergency autonomous driving release button is performed during autonomous driving or remote control, autonomous driving and remote control are turned off.

Figure 5A:
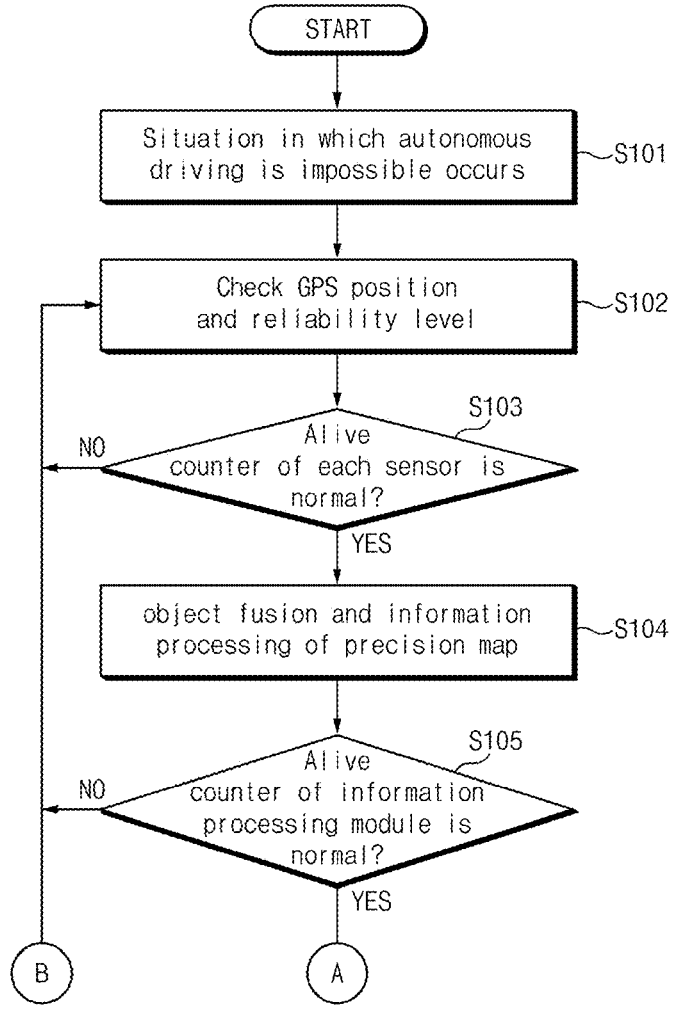
FIGS. 5A and 5B illustrates a remote control request method for an autonomous vehicle according to an exemplary embodiment of the present disclosure.
Figure 5B:
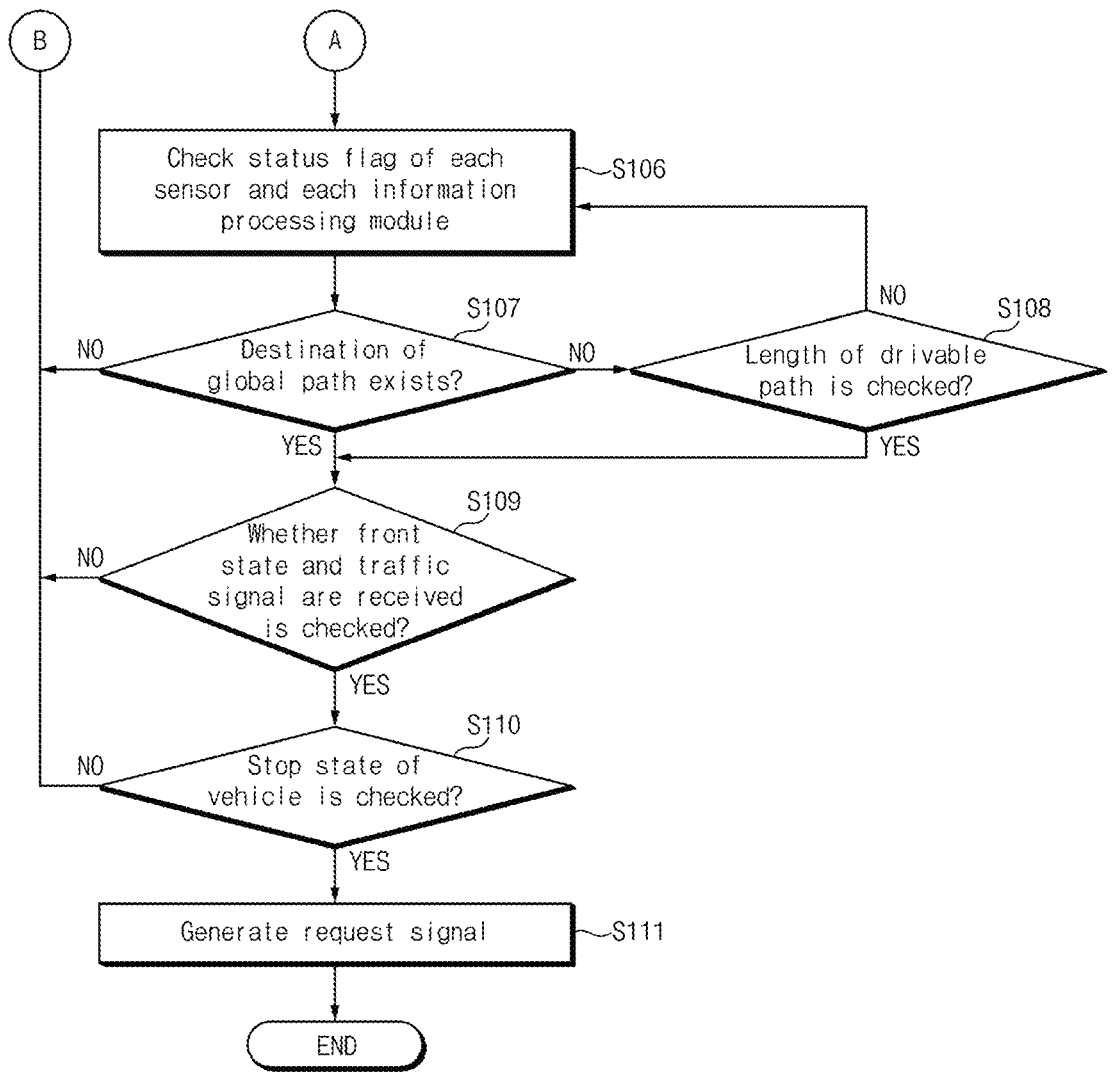

Hereinafter, a remote control request method for an autonomous vehicle according to an exemplary embodiment of the present disclosure will be described in detail with reference to FIGS. 5A and 5B. FIGS. 5A and 5B illustrates a remote control request method for an autonomous vehicle according to an exemplary embodiment of the present disclosure.

Hereinafter, it is assumed that the autonomous driving control apparatus 110 of the vehicle 100 illustrated in FIG. 1 performs processes of FIGS. 5A and 5B. In addition, in the description of FIGS. 5A and 5B, it may be understood that operations described as being performed by each system are controlled by a processor of each of the systems.

Referring to FIGS. 5A and 5B, the autonomous driving control apparatus 110 of the vehicle 100 determines whether driving of a current path is impossible due to an external environment during autonomous driving (S101), and when autonomous driving is not possible on the current path, activates a GPS signal and a remote control driving function (S101), and requests the control system 200 to perform the remote control (S102).

The autonomous driving control apparatus 110 checks a GPS position and a reliability level (S102).

The autonomous driving control apparatus 110 determines whether an output value of an alive counter of each sensor is normal (S103).

The autonomous driving control apparatus 110 performs object fusion and information processing of precision map (S104), and determines whether an output value of an alive counter of an information processing module is normal (S105).

The autonomous driving control apparatus 110 checks a status flag of each sensor and each information processing module (S106). In this case, the status flag is displayed as "1" when it is normal, and "0" when it is abnormal.

When each sensor and each information processing module are normal, the autonomous driving control apparatus 110 determines whether a destination of the global path exists (S107). When the destination of the global path does not exist, the autonomous driving control apparatus 110 checks a length of the drivable path (S108). When the destination of the global path does not exist and the length of the drivable path is not checked, the process returns to step S106 to recheck the status flags of each sensor and each information processing module.

In this case, the autonomous driving control apparatus 110 may determine whether a destination of the global path exists by using a global path planning (GPP) flag. The global path may be generated by collecting several local paths, and when the destination of the global path is unclear, only drivable paths among the local paths may be displayed.

As such, when it is difficult to follow the global path due to an unclear destination or a path is not created due to an obstacle, etc., a distance of a drivable path generated without a destination may be checked by checking a most probable path (MPP). In this case, the drivable path may be shorter than or equal to the GPP. In addition, remote control of the drivable path is possible by checking the length of the drivable path, and thus the length of the drivable path may also be transmitted to the control system 200 when the remote control request signal is transmitted.

When length information of the drivable path is checked, the autonomous driving control apparatus 110 checks whether a front state and a traffic signal are received (S109).

When the front state is checked and the traffic signal is received, the autonomous driving control apparatus 110 checks a stop state of the vehicle (S110). That is, the autonomous driving control apparatus 110 may determine whether the control system 200 has been stopped for more than a predetermined time t(sec) and has stopped at a place designated by the control system 200. In addition, when the vehicle is stopped at a place pre-designated by the control system 200, it is determined that the vehicle is in a normal stop state and a remote control request is transferred to the control system 200, and the pre-designated place may be determined in advance by the control system 200.

However, the control system 200 may perform remote control of the vehicle 100 without a request from the vehicle 100 while the vehicle is stopped for less than the predetermined time t (sec) designated by the control system 200. In this case, the control system 200 may control a sensor of the vehicle 100, etc. to check the stop state of the vehicle 100. In addition, for example, when a traffic light is green and there is no vehicle in front, but the vehicle is continuously stopped, the autonomous driving control apparatus 110 may determine an abnormal stop state to request remote control.

When it is checked that the vehicle is stopped, a remote control request signal may be generated and transmitted to the control system 200 (S111).

The autonomous driving control apparatus 110 may respond by checking whether a driver arbitrarily manipulates steering and an acceleration or deceleration device and whether or not an emergency autonomous driving release button is manipulated at a predetermined interval during the steps S101 to S111. That is, the autonomous driving control apparatus 110 may release the autonomous driving mode and transfer the control authority to the driver when the driver arbitrarily manipulates the steering and the acceleration or deceleration device or manipulates the emergency autonomous driving release button. In this case, when the autonomous driving mode is released, the remote control is also impossible.

FIG. 6A to FIG. 6E each illustrates a view for describing an example of displaying a remote control request state of an autonomous vehicle according to an exemplary embodiment of the present disclosure.

Figure 6A:
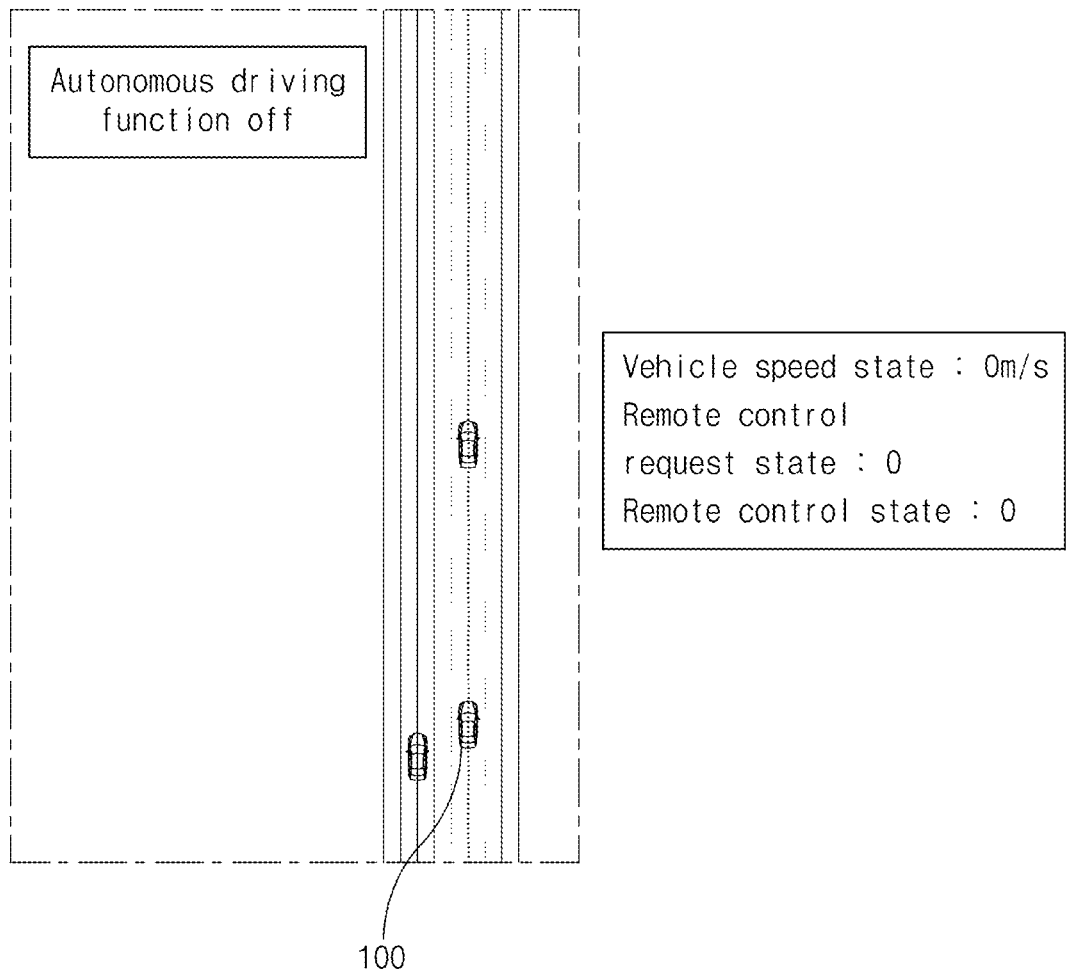
FIG. 6A to FIG. 6E each illustrates a view for describing an example of displaying a remote control request state of an autonomous vehicle according to an exemplary embodiment of the present disclosure.

FIG. 6A illustrates an example of a screen of the interface device 113 of the vehicle 100 indicating that an autonomous driving function is turned off. In this case, a vehicle speed state is 0 m/s, and flags of a remote control request state and a remote control state are all 0. That is, there is no remote control request in a state in which the vehicle stops, and the remote control state indicates an off state.

Figure 6B:
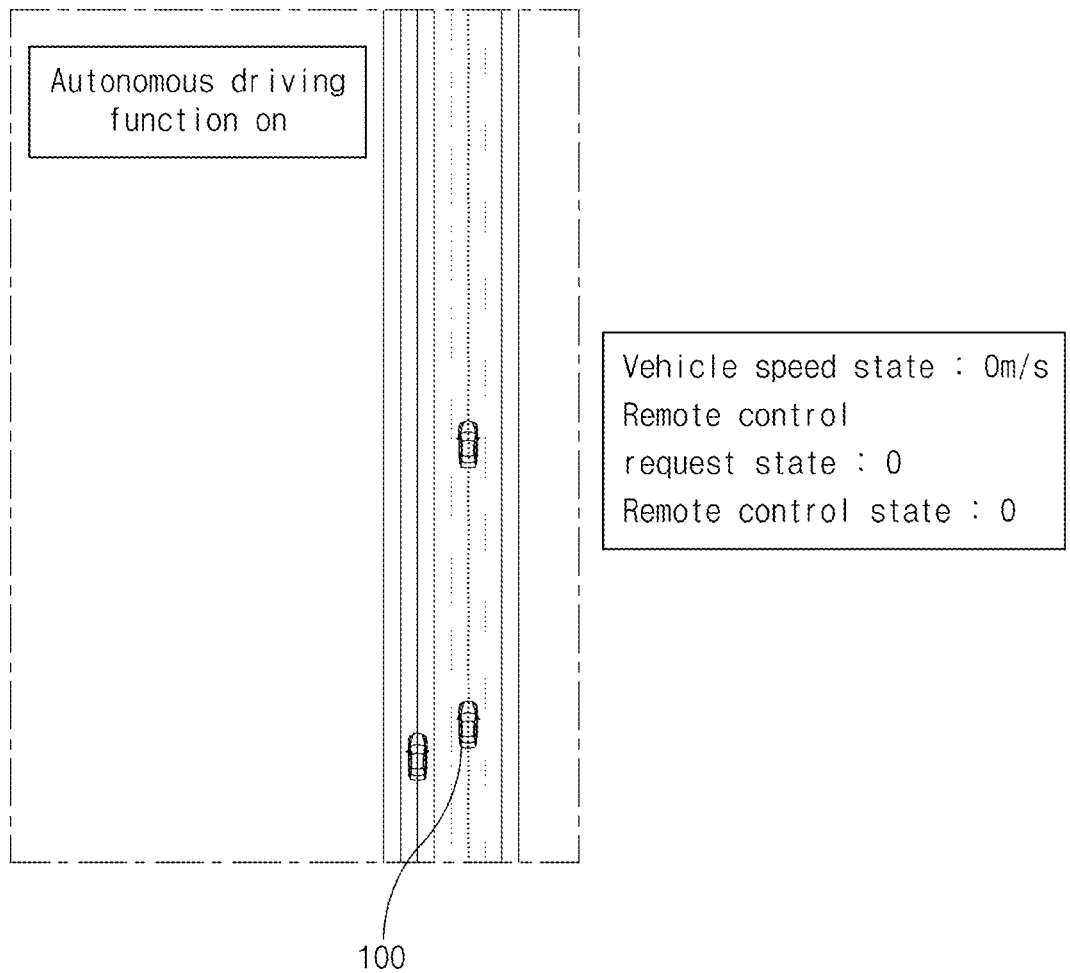

FIG. 6B illustrates an example of a case in which the autonomous driving function is switched from the off state to an on state, and in this case, the vehicle speed state is 0 m/s, and the flags of the remote control request state and the remote control state are all 0, indicating that a state before the remote control request signal is transmitted when the vehicle stops.

Figure 6C:
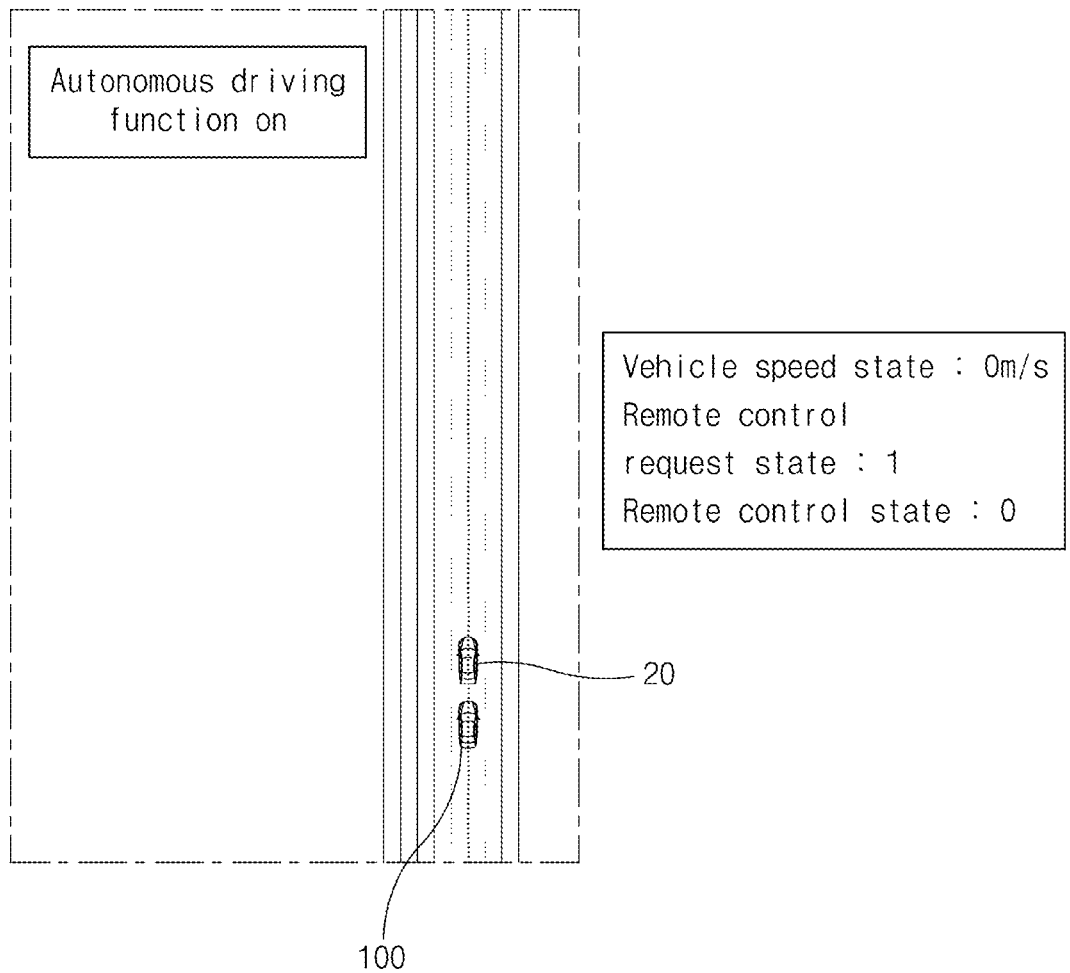

FIG. 6C illustrates an example of a state in which it is determined that the vehicle 100 is in a remote-controllable state while the autonomous driving function is turned on, and in this case, the vehicle speed state is 0 m/s, a flag of the remote control request state is changed to 1, and a flag of the remote control state is 0. It is a situation in which autonomous driving cannot be continued due to the presence of an obstacle 20 in front of the vehicle 100, and a remote control request is required, and it is checked that the remote control request is possible while the vehicle is stopped, and the remote control state is still in the off state.

Figure 6D:
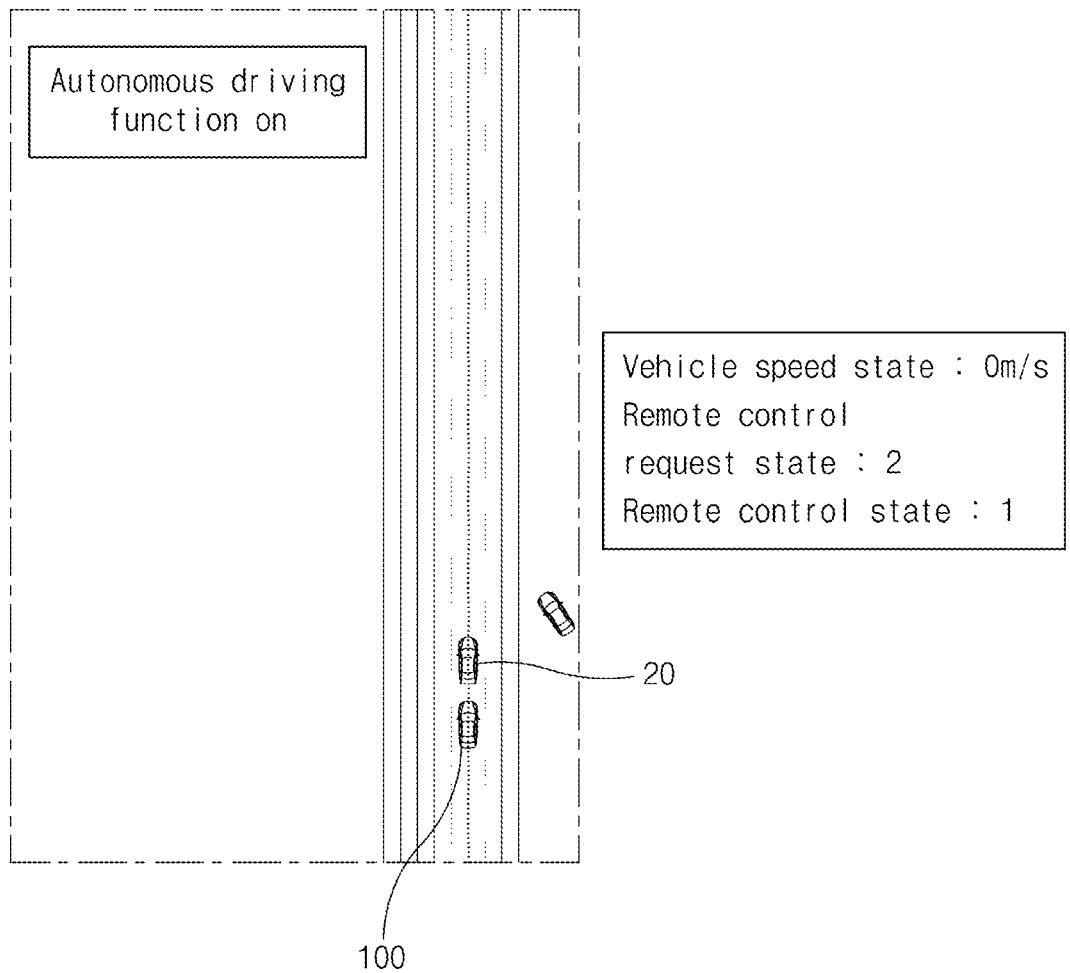

FIG. 6D illustrates a state in which the vehicle 100 requests the control system 200 to perform the remote control in a state in which the autonomous driving function is turned on. In this case, the vehicle speed state is 0 m/s, the flag of the remote control request state is changed from 1 to 2, and the flag of the remote control state is changed from 0 to 1. That is, a remote control request is made while the vehicle is stopped, and the remote control state is a wait state. That is, the vehicle 100 requests the control system 200 to perform the remote control and waits for a remote control command.

Figure 6E:
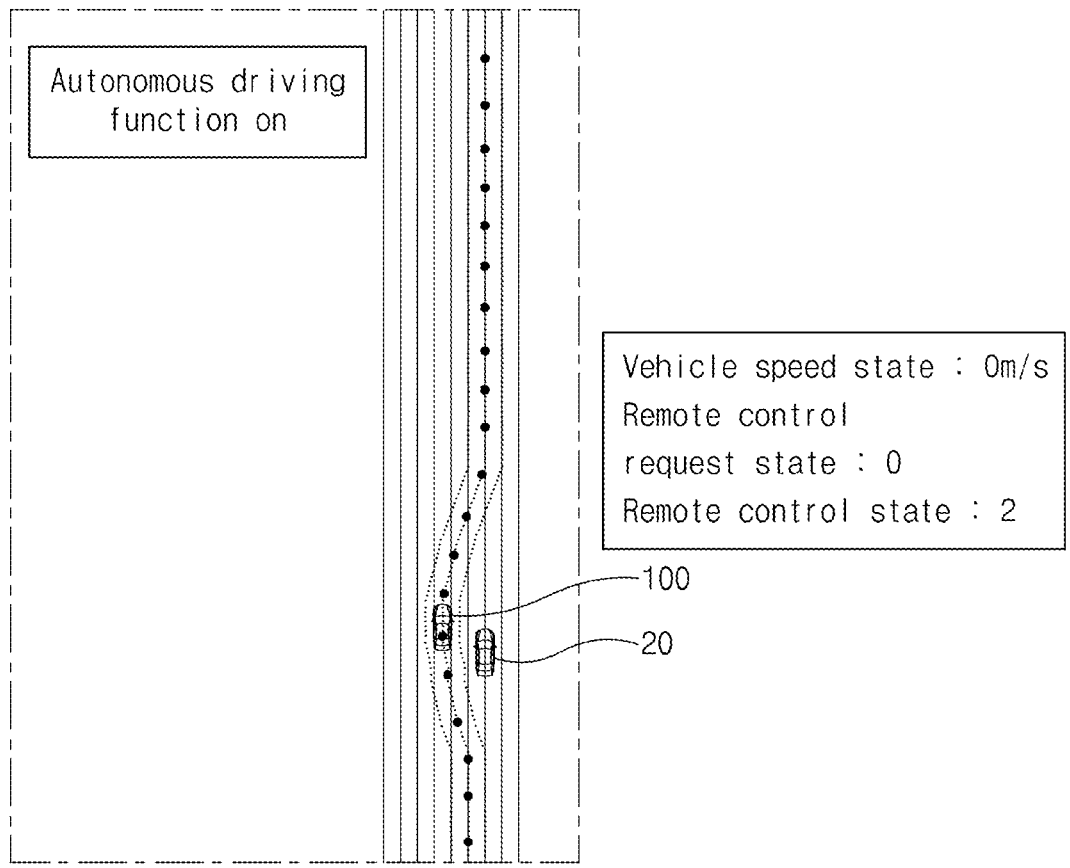

FIG. 6E illustrates an example of controlling the vehicle 100 to avoid the obstacle 20 depending on a remote control command from the control system 200 in a state in which the autonomous driving function is turned on. The vehicle speed state is 0 m/s, the flag of the remote control request state is changed from 2 to 0, and the flag of the remote control state is changed from 1 to 2.

As such, according to the present disclosure, when the vehicle is in a stop state due to an unexpected situation during autonomous driving, a remote control request may be transferred to the control system 200. However, according to the present disclosure, after determining in advance whether the vehicle is in a state capable of performing a remote control command, when the remote control command can be performed, the remote control request may be transferred to the control system 200.

In addition, according to the present disclosure, when arbitrary manipulation of a user occurs, a remote control mode or an autonomous driving mode may be released, and control authority may be transferred to the user.

Figure 7:
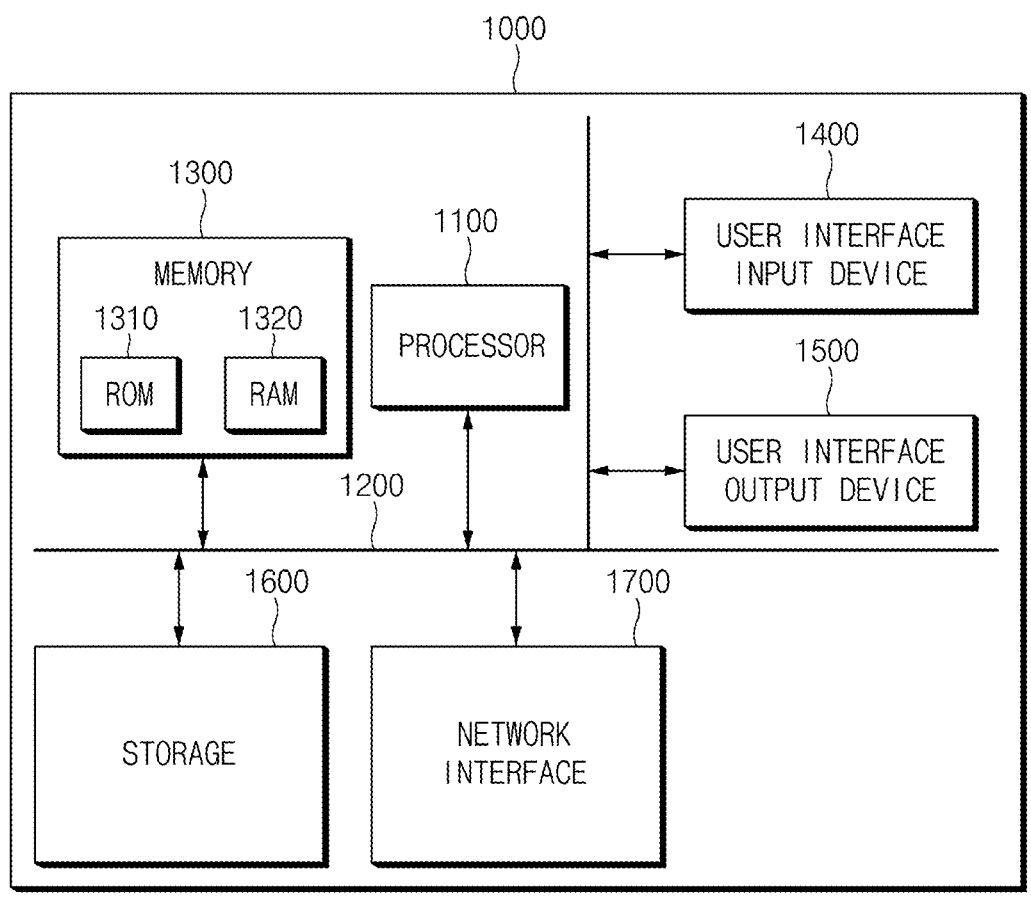
FIG. 7 illustrates a computing system according to an exemplary embodiment of the present disclosure.

FIG. 7 illustrates a computing system according to an exemplary embodiment of the present disclosure.

Referring to FIG. 7, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An autonomous vehicle comprising:
a processor configured to: determine whether the autonomous vehicle is in a state in which remote control is enabled to be performed through determination of whether a global path is abnormal or whether a local path is abnormal and when the remote control of the autonomous vehicle is required, determine that the global path is in an abnormal state when a destination does not exist on the global path, request a control system to perform the remote control when the autonomous vehicle is in the state in which the remote control is enabled to be performed, transmit a distance of a drivable path generated without the destination to the control system when the destination does not exist on the global path, and control the autonomous vehicle based on a command received from the control system; and
a communication device configured to perform communication with the control system under control of the processor.

2. The autonomous vehicle of claim 1, further comprising a sensing device configured to detect autonomous driving information and vehicle state information.

3. The autonomous vehicle of claim 2, wherein the sensing device includes:
one or more sensors; and
one or more information processing modules configured to perform object fusion based on output information of the one or more sensors.

4. The autonomous vehicle of claim 3, wherein the processor determines whether the autonomous vehicle is in the state in which the remote control is enabled to be performed through determination of at least one of whether the one or more sensors operate normally, whether the one or more information processing modules operate normally, or whether a communication state is abnormal.

5. The autonomous vehicle of claim 4, wherein the processor receives an output value of an alive counter from the one or more sensors every predetermined cycle to determine whether the one or more sensors are operating normally.

6. The autonomous vehicle of claim 4, wherein the processor receives an output value of an alive counter from the one or more information processing modules every predetermined cycle to determine whether the one or more information processing modules are operating normally.

7. The autonomous vehicle of claim 4, wherein the processor determines that the global path is in a normal state when a global path planning (GPP) flag is normal.

8. The autonomous vehicle of claim 1, wherein the processor controls the communication device to transmit a length of the drivable path when the control system is requested to perform the remote control.

9. The autonomous vehicle of claim 1, wherein the processor determines that a remote control request transferred to the control system is possible when the autonomous vehicle is in a normal stop state.

10. The autonomous vehicle of claim 9, wherein
in the case where a stop state of the autonomous vehicle is maintained for a predetermined time period,
the processor determines that the autonomous vehicle is in the normal stop state when the autonomous vehicle is in a waiting state depending on a traffic signal or traffic flow, and
the processor determines that the autonomous vehicle is in an abnormal stop state as an abnormal state of the local path when it stops regardless of the traffic signal or the traffic flow and a front situation.

11. The autonomous vehicle of claim 9, wherein the processor determines that the autonomous vehicle is normally stopped when the autonomous vehicle is stopped for more than a reference time period that is predetermined by the control system or the autonomous vehicle is stopped at a place that is predetermined by the control system.

12. The autonomous vehicle of claim 9, wherein the processor immediately requests the control system to perform the remote control when the autonomous vehicle is stopped for more than a reference time period that is predetermined by the control system or the autonomous vehicle is stopped at a place that is predetermined by the control system.

13. The autonomous vehicle of claim 1, wherein
when arbitrary manipulation of a steering device or an acceleration or deceleration device is inputted by a driver, or manipulation of an emergency autonomous driving release button is inputted during an autonomous driving mode or a remote control mode,
the processor releases the autonomous driving mode or the remote control mode, and switches to a manual driving mode.

14. A remote control request method for an autonomous vehicle, comprising:
determining, by a processor, whether the autonomous vehicle is in a state in which remote control is enabled to be performed through determination of whether a global path is abnormal or whether a local path is abnormal and when the remote control of the autonomous vehicle is required, determining, by the processor, that the global path is in an abnormal state when a destination does not exist on the global path, and transmitting, by the processor, a distance of a drivable path generated without the destination to the control system when the destination does not exist on the global path; and; and
requesting, by the processor, a control system to perform the remote control when the autonomous vehicle is in the state in which the remote control is enabled to be performed; and
controlling, by the processor, the autonomous vehicle based on a command received from the control system.

15. The remote control request method of claim 14, wherein the determining of whether the autonomous vehicle is in the state in which the remote control is enabled to be performed includes determining, by the processor, whether the autonomous vehicle is in the state in which the remote control is enabled to be performed through determination of at least one of whether one or more sensors for detecting autonomous driving information and vehicle state information operate normally, whether one or more information processing modules for performing object fusion based on output information of the one or more sensors operate normally, or whether a communication state is abnormal.

16. The remote control request method of claim 15, wherein
the determining of whether the autonomous vehicle is in the state in which the remote control is enabled to be performed further includes:
receiving, by the processor, an output value of an alive counter from the one or more sensors every predetermined cycle to determine whether the one or more sensors are operating normally; and
receiving, by the processor, an output value of an alive counter from the one or more information processing modules every predetermined cycle to determine whether the one or more information processing modules are operating normally.

17. The remote control request method of claim 16, wherein the determining of whether the autonomous vehicle is in the state in which the remote control is enabled to be performed includes determining, by the processor, that the remote control is possible when the global path is in a normal state or a length of the drivable path generated without the destination is determined.

18. The remote control request method of claim 16, wherein the determining of whether the autonomous vehicle is in the state in which the remote control is enabled to be performed includes determining, by the processor, that a remote control request transferred to the control system is possible when the autonomous vehicle is in a normal stop state.

* * * * *